United States Patent [19]

Sikkema

[11] 4,029,637

[45] June 14, 1977

[54] ACID DYEABLE POLYESTER CONTAINING 1,8-BIS-(DIALKYL-AMINO)NAPHTHALANE

[75] Inventor: Doetze J. Sikkema, Duiven, Netherlands

[73] Assignee: Akzona Incorporated, Asheville, N.C.

[22] Filed: Mar. 6, 1975

[21] Appl. No.: 556,064

[30] Foreign Application Priority Data

Mar. 22, 1974  Netherlands ..................... 7403884

[52] U.S. Cl. ...................... 260/75 N; 260/45.9 R
[51] Int. Cl.² ................ C08G 63/76; C08G 63/02
[58] Field of Search ........ 260/75 N, 32.6 R, 45.9 R

[56] References Cited

UNITED STATES PATENTS

| 2,812,313 | 11/1957 | Nischk et al. | 260/75 N X |
| 2,945,010 | 7/1960 | Caldwell et al. | 260/75 N |
| 3,551,381 | 12/1970 | Stewart et al. | 260/75 N X |

FOREIGN PATENTS OR APPLICATIONS

| 38-10050 | 6/1963 | Japan | 260/75 N |
| 37-10050 | 8/1962 | Japan | 260/75 N |

*Primary Examiner*—Lucille M. Phynes
*Attorney, Agent, or Firm*—Francis W. Young; Jack H. Hall

[57] ABSTRACT

A filament-forming polyester or copolyester and fibers thereof composed of at least 80% of ethylene terephthalate units containing a tertiary amine as an additive to improve the receptivity for acid dyes. The invention provides novel additives comprising 1,8-diaminonaphthalenes in which the two amino groups have four alkyl substituents with 1–4 carbon atoms and the nucleus may have H, alkyl or aralkyl substituents. The preferred additive is N,N,N',N'-tetramethyl-1,8-diamino-naphthalene. A preferred copolyester contains 1–10% ethylene azelate units. The novel additives improve the exhaustion of the dye bath and the wash fastness of the dyed filaments.

8 Claims, No Drawings

ACID DYEABLE POLYESTER CONTAINING 1,8-BIS-(DIALKYL-AMINO)NAPHTHALANE

The invention relates to a filament forming polyester comprising at least 80 mole % repeating structural units of ethylene terephthalate, such polyester comprising a tertiary aromatic amine.

A polyester of this type exhibiting an improved affinity for acid and disperse dyes is cited in Japanese Patent Specification 10050/63. As an example of a suitable tertiary aromatic amine this patent describes the addition of among others N,N,N',N'-tetramethyl-1,5-diamino naphthalene to polyethylene terephthalate.

Although, compared with unmodified polyethylene terephthalate or copolyesters derived therefrom, these known polyesters possess an improved affinity for acid dyes, they have a number of disadvantages which make them unsuitable for any practical use. Filaments or fibers made from these polyesters usually provide insufficient exhaustion of the dye bath used in dyeing these products. Specifically, this is the case in dyeing textile products made from a homopolyester. Moreover, the wash fastness of said dyed textile products does not meet normal requirements.

There has now been found an acid-dyeable polyester that does not exhibit the cited drawbacks.

The invention provides that the polyester contains 0.001 – 10 mole % of a 1,8-diamino naphthalene derivative of the following formula:

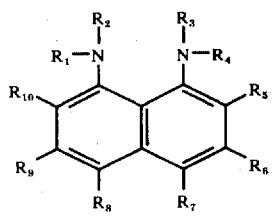

wherein $R_1$ to $R_4$ represent an alkyl group with 1 to 4 C atoms and $R_5$ to $R_{10}$ an H atom, an alkyl group, or an aralkyl group.

Compared with known polyesters, the polyester according to the invention provides in the presence of acid dyes a much more complete exhaustion of the bath, while the dyed articles such as filaments and fibers exhibit a substantially improved wash fastness. This improvement in characteristics could not have been anticipated. In retrospective, the improved wash fastness could be ascribed to the typical configuration of the molecular structure of 1,8-diamino naphthalene derivatives. It comprises two N atoms so closely spaced that together they can bond by steric hindrance any proton found between these N atoms, this steric hindrance being assisted by the shielding effect of alkyl groups bonded to the N atoms. A proton belonging to the molecule of an acid dye, once similarly bonded will be very difficult to remove, as manifested by the good wash fastness of the material in question.

The 1,8-diamino naphthalene derivatives of the polyester according to the invention may carry at the naphthalene nucleus one or more substituents in the form of alkyl groups such as methyl, ethyl, propyl, isopropyl, etc., or aralkyl groups such as benzyl, ethyl benzyl, etc. The presence of these substituents is not essential to the invention. Since they are relatively easy to prepare and to process, preference is given to those 1,8-diamino naphthalene derivatives which except for the two N atoms carry no substituents on the naphthalene ring.

The alkyl groups linked to the two N atoms of 1,8-diamino naphthalene derivatives may comprise from 1 to 4 C atoms, e.g., methyl, ethyl, propyl, butyl, isobutyl. Since the best wash fastnesses are obtained with methyl groups, preference is given to N,N,N',N'-tetramethyl-1,8-diamino naphthalene.

Derivatives of 1,8-diamino naphthalene can be conventionally prepared. Starting, for example, with naphthalene, subsequent nitration and hydrogenation followed by methylation of the formed 1,8-diamino naphthalene will yield N,N,N',N'-tetramethyl-1,8-diamino naphthalene.

Depending on field of application and desired effect, the quantity of 1,8-diamino naphthalene derivatives to be incorporated in the polyester may vary between 0.001 and 10 mole %. The term mole % is understood to mean the number of moles of 1,8-diamino naphthalene derivatives per 100 moles of the repeating structural unit or, in the case of a copolyester, of the structural units of the polyester chain. In principle, the affinity of the polyester for acid dyes is proportional to the quantity of 1,8-diamino naphthalene derivative it contains. For reasons of cost, this quantity should be kept as small as possible. For pastel dyeings, quantities between 0.01 – 0.05 mole % are usually adequate. Still lower quantities, e.g., of the order of magnitude of 0.001 mole % will be used in the production of optically bleached polyester yarns. Such yarns can be obtained by successively bleaching, e.g., with sodium chlorite, treatment with an optical brightener and dyeing with a small quantity of a violet acid dye that hides any last trace of yellowing. Because of the good wash fastness of the yarns of the invention, the violet dye remains in the yarn even after numerous washings, insuring a permanent whiteness. In known polyester yarns subjected to a similar treatment, the violet dye is washed out after a few washings leaving a permanent yellowing.

For dyeings in deeper tints, the 1,8-diamino naphthalene derivative content should be selected in the range between 1 to 10 mole %. The optimum content of 1,8-diamino naphthalene derivative is determined mainly by the type of dye used, the type of polyester, and the desired tint depth. For the dyeing of polyethylene terephthalate yarn with 1 weight % of an acid dye it is as a rule sufficient to add 2 mole % of a 1,8-diamino naphthalene derivative. In practice, the optimum content of 1,8-diamino naphthalene derivative of the polyester to be dyed is determined empirically.

The polyester according to the invention may be either a homopolyester or a copolyester. In the case of a homopolyester, the chain building molecules are composed exclusively of terephthalate units.

In the case of a copolyester, there are in addition to at least 80 mole % ethylene terephthalate units, chain components that can be considered derived from diols and/or dicarboxylic acids other than ethylene glycol and terephthalic acid, respectively. Likely diols are aliphatic diols with 3 to 10 C atoms, e.g., propylene glycol, isobutylene glycol, tetramethylene glycol, pentamethylene glycol, hexamethylene glycol.

Examples of alternative dicarboxylic acids are such aromatic dicarboxylic acids as isophthalic acid and naphthalene dicarboxylic acid, and such aliphatic dicarboxylic acids with 2 to 12 C atoms as oxalic acid, malonic acid, succinic acid, adipic acid, azelaic acid. A copolyester containing 1 – 10 mole % ethylene azelate units in addition to the ethylene terephthalate units is preferred because of its superior properties.

In addition to the above-mentioned chain components, the polyester of the invention may also comprise conventional additives of polyester compositions, e.g., delustering agents, fillers, flame-proofing agents, light and heat stabilizers, etc.

Polyesters of the invention may be prepared by addition of the 1,8-diamino naphthalene derivative of the polyester-forming components during the polycondensation phase of the polyester formation, or to the finished polycondensate. Although the 1,8-diamino naphthalene derivatives have generally sufficient thermal stability to withstand for a prolonged time without decomposing the temperatures normally used in the polyester preparation, it is preferable, in connection with the color of the formed polycondensate, to add these derivatives at the latest possible stage of the preparation. In the preparation of polyethylene terephthalate from dimethyl terephthalate and ethylene glycol, with bis-($\beta$-hydroxyethyl)-terephthalate being first formed in an ester interchange phase, and then converted during a polycondensation phase to polyethylene terephthalate, the 1,8-diamino naphthalene derivatives should, therefore, preferably be added toward the end of this polycondensation phase.

It is possible to keep the addition of 1,8-diamino naphthalene derivative separate from the actual polyester preparation. Thus, the finished, solid polycondensate, in the form of chips, granules, powder, etc., can be mixed with the desired quantity of 1,8-diamino naphthalene derivatives by, e.g., introduction in a rotating drum. A homogeneous product can be obtained by melting the mixture obtained in this fashion in a melting unit incorporating a mixing effect, e.g., in an extruder.

The latter method of operation is eminently suitable for the manufacture of shaped items, particularly yarns and fibers, whereby the mix flowing from the extruder is subsequently shaped, e.g., spun to filaments. In another version, liquid 1,8-diamino naphthalene derivative is injected with a metering pump into melted polyester which is extruded after passing a mixer. The mixture is subsequently processed either to shaped articles, e.g., filaments, or into granules or chips for later molding.

The manufacture of molded items, particularly the spinning of filaments and fibers from the polyester of the invention, does not require any special equipment or procedures and may be carried out by means known in connection with polyesters.

The major outgrowth of the present invention is the possibility of manufacturing textile products such as woven fabrics, knits and carpets having a very good dye wash fastness, using polyester dyed with acid dyes. This makes possible large-scale application of the relatively inexpensive acid dyes in the dyeing of polyesters.

The invention provides, moreover, a possibility of dyeing textile products composed of a polyester/wool blend.

Moreover, the polyester according to the invention permits the use of "cross-dyeing," a dyeing method commonly used in dyeing polyamide textile products. In cross-dyeing, a textile product made from filaments or fibers of varying affinity for the dyes to be used, is dyed in a single bath containing at least two different dyes, producing a multicolor effect. In analogy with known methods for cross-dyeing polyamides, a great many color combinations can be achieved with a single bath by proper selection of different types of yarns and/or dyes.

The invention is explained in more detail in the following examples. Unless otherwise specified, the terms and concepts used shall be interpreted in the following manner.

The $\eta_{rel}$ (relative viscosity) is the ratio of time required by a solution of 1 weight % polyester in m-cresol at 25° C. to flow out of a capillary viscosimeter to that required by the pure solvent.

Dyeing was performed at pH = 5.5 with 1% dye, based on the weight of the material to be dyed, for 60 minutes at 125° C. at a liquor ratio of 1:20.

The bath exhaustion resulting from the dye uptake of the dyed material was determined by measuring the optical transmission of the bath liquid before and after dyeing, and by using the Lambert-Beer Law to calculate the corresponding concentration difference.

The wash fastnesses of the dyed samples were determined by washing with a 2 g./l. Ultravon JU and 5 g./l. Marseilles soap, respectively, at a liquor ratio of 1:40 and a temperature of 40° C. The change in color of the washed material with respect to unwashed material was evaluated according to NEN 5202 and 5203. The evaluation was expressed in indices from 1 to 5, with 5 representing no change and 1 considerably change in color. For practical purposes, a wash fastness using this criterion is acceptable when assigned a 4 or 5 at evaluation. Lower figures indicate unsatisfactory wash fastness.

EXAMPLE 1

Polyethylene terephthalate was prepared from ethylene glycol and dimethyl terephthalate with addition of 340 ppm Mn acetate. $4H_2O$, 300 ppm $GeO_2$ and 135 ppm trimethyl phosphate. The polycondensate had a relative viscosity of 1.64; upon drying, it was cut into chips and mixed in a rotating drum with 2 mole % N,N,N',N'-tetramethyl-1,8-diamino naphthalene in powder form. The resulting mix was spun to filaments using an extrusion melt spinning machine and a temperature of about 270° C. The filament was subsequently drawn on two hot pins at a temperature of 85° and 155° C. respectively, at a drawing ratio of 6.0 to 35/8 (dtex) yarn.

The yarn thus obtained was designated Yarn A. Three other yarns were spun in a similar manner, but instead of N,N,N',N'-tetramethyl-1,8-diamino naphthalene, N,N,N',N'-tetramethyl-1,5-diamino naphthalene (yarn B), pentaphenyl guanidine (yarn C) and no amine (yarn D), respectively, were added to the polymer. Skeins of yarns A, B, C, and D were made up and dyed as indicated with the acid dye Nylosan blue F-GLB. The wash fastness was determined by washing the dyed skeins of yarns A and B with Ultravon JU and Marseilles soap. Dyeing and washing results are listed in Table I.

TABLE I

| Yarn | Additive | $\eta$rel | Bath Exhaust. | Wash Fastness Index | |
|---|---|---|---|---|---|
| | | | | Ultravon JU | Marseilles Soap |
| A | N,N,N',N'-tetramethyl 1,8-diamino | 1.57 | >90% | 4 – 5 | 4 |

TABLE I-continued

| Yarn | Additive | ηrel | Bath Exhaust. | Wash Fastness Index Ultravon JU | Marseilles Soap |
|---|---|---|---|---|---|
| | naphthalene | | | | |
| B | N,N,N',N'-tetramethyl-1,5-diamino naphthalene | 1.58 | 50 | 2 | 2 |
| C | Pentaphenyl guanidine | 1.56 | 10 | — | — |
| D | None | 1.58 | 0 | — | — |

Table I indicates that Yarn A according to the invention is far superior to each of the yarns B, C and D lying outside the scope of the invention. In view of the low exhaustion level of the dye bath, pentaphenyl guanidine (Yarn C), known to be a strong base, hardly contributes to the affinity for acid dyes.

The wash fastness of Yarn A is also superior to that of the known Yarn B. Because of its wash fastness index of 4 or higher, Yarn A meets the demands posed by household and professional cleaning treatments. Yarn B (wash fastness index 2) does not comply with these requirements.

EXAMPLE 2

A copolyester was prepared from ethylene glycol, dimethyl terephthalate and dimethyl azelate with addition of 340 ppm Mn acetate. $4H_2O$, 300 ppm $GeO_2$ and 135 ppm trimethyl phosphate. The copolyester contained 8 mole % ethylene azelate units and had a relative viscosity of 1.71. The cited copolyester in the form of chips was mixed as outlined in Example 1 with 2 mole % N,N,N',N'-tetramethyl-1,8-diamino naphthalene then spun and drawn to 35/8 (dtex) yarn.

The resulting yarn is identified as Yarn E. A Yarn F was spun in a similar manner using a mixture of the above-mentioned copolyester with 2 mole % N,N,N',-N'-tetramethyl-1,5-diamino naphthalene. Yarns E and F were dyed with 1 weight % of the metal complex dye Irgalan blue RL. The wash fastnesses of the dyed yarns were determined with Ultravon JU and Marseilles soap. The results of these experiments are listed in Table II.

TABLE II

| Yarn | Additive | Yarn ηrel | Bath Exhaust. | Wash Fastness Index Ultravon JU | Marseilles Soap |
|---|---|---|---|---|---|
| E | N,N,N'N'-tetramethyl 1,8-diamino naphthalene | 1.63 | >90 | 4 – 5 | 4 |
| F | N,N,N'N'-tetramethyl 1,5-diamino naphthalene | 1.68 | 40 | 2 | 2 |

It appears from this example that on dyeing the copolyester yarn with a metal complex dye, the yarn according to the invention (Yarn E) leads to a much higher exhaustion of the bath than the control Yarn F. Moreover, Yarn E had a good wash fastness while that of the control Yarn F is unsatisfactory.

EXAMPLE 3

The copolyester cited in Example 2, composed of ethylene terephthalate and 8 mole % ethylene acelate units was mixed with 2 mole % N,N,N',N'-tetraethyl-1,8-diamino naphthalene. The mixture was spun and drawn as outlined in Example 1. The yarn obtained was identified as Yarn G. A control Yarn H was made in a corresponding manner, using a mixture of the cited copolyester and 2 mole % N,N,N',N'-tetraethyl-1,2-diamino benzene. Yarns G and H were dyed with Isolan scarlet GLS. Bath exhaustion was greater than 90% for Yarn G and 60% for Yarn H. This example shows that Yarn H, although it contains a diamino compound that is structurally related with the diamino naphthalene derivative incorporated in Yarn G, is inferior to the latter yarn included in the scope of the invention.

EXAMPLE 4

Dyeing of polyester textile products by the cross-dyeing method is detailed in this example. A polyester yarn of 150/30 (dtex) dyeable with acid dyes was made using a mixture of polyethylene terephthalate and 1.5 mole % N,N,N',N'-tetramethyl-1,8-diamino naphthalene. This yarn was knitted together with basic dyeing polyester yarn (composed of a copolyester of ethylene terephthalate units and 2 mole % ethylene-Na-5-sulfoisophthalate units) of 150/30 (dtex) so that the knit had alternating strips of acid-dyeing and basic-dyeing material. The knit was dyed in a dye bath containing 1% of the acid dye Nylosan blue F-GBL and 1% of the basic dye Astrazon red F3BL, whereby the percentages of dye used were based on the weight of both acid dyeing and basic dyeing yarns in the knit. To prevent the formation of a precipitate due to the simultaneous presence of acid and basic dyestuffs, 1% based on the total weight of the knit to be dyed, of the auxiliary Univadin W was added to the dye bath. The dyeing was carried out at pH = 5.5 for 60 minutes at a temperature of 125° C. and a liquor ratio of 1:20. The result of the dyeing procedure was a knit with alternating bright red and blue stripes. Bath exhaustion of the acid dye was in excess of 90%. The wash fastness of the blue strips, determined after washing in Ultravon JU and Marseilles soap was 4 – 5 and 4, respectively.

What is claimed is:

1. A filament-forming polyester comprising at least 80 mole % of repeating structural units of ethylene terephthalate in which is incorporated 0.001 – 10 mole % of a derivative of 1,8-diamino naphthalene of the following formula:

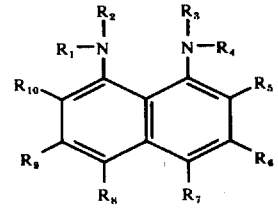

wherein $R_1$ and $R_4$ represent an alkyl group with 1 – 4 C atoms and $R_5$ and $R_{10}$ an H atom, an alkyl group, or an aralkyl group.

2. The polyester according to claim 1 in which the naphthalene derivative is N,N,N',N'-tetra-alkyl-1,8-diamino naphthalene.

3. The polyester according to claim 2 in which the naphthalene derivative is N,N,N',N'-tetramethyl-1,8-diamino naphthalene.

4. The polyester according to claim 1 in which the polyester is a copolyester composed of 90 – 99 mole % ethylene terephthalate units and 1 – 10 mole % ethylene azelate units.

5. Polyester fiber comprising at least 80 mole % of repeating structural units of ethylene terephthalate in which is incorporated 0.001 – 10 mole % of a derivative of 1,8-diamino naphthalene of the following formula:

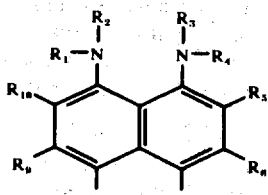

wherein $R_1$ and $R_4$ represent an alkyl group with 1 – 4 C atoms and $R_5$ and $R_{10}$ an H atom, an alkyl group, or an aralkyl group.

6. The fiber of claim 5, in which the naphthalene derivative is N,N,N',N'-tetra-alkyl-1,8-diamino naphthalene.

7. The fiber of claim 5, in which the naphthalene derivative is N,N,N',N'-tetramethyl-1,8-diamino naphthalene.

8. The fiber of claim 5, in which the polyester is a copolyester composed of 90 – 99 mole % ethylene terephthalate units and 1 – 10 mole % ethylene azelate units.

* * * * *